(12) United States Patent
Barbanson et al.

(10) Patent No.: US 7,389,477 B2
(45) Date of Patent: Jun. 17, 2008

(54) LEGIBILITY OF SELECTED CONTENT

(76) Inventors: Monique Barbanson, 781 Pal Ave., Palo Alto, CA (US) 94306; Pradip K. Fatehpuria, 20800 Valley Green Dr., #496, Cupertino, CA (US) 95014; Michael J. Darnell, 2455 Cottle Ave., San Jose, CA (US) 95125

( * ) Notice: Subject to any disclaimer, the term of this patent is extended or adjusted under 35 U.S.C. 154(b) by 400 days.

(21) Appl. No.: 11/150,365

(22) Filed: Jun. 10, 2005

(65) Prior Publication Data
US 2005/0235222 A1 Oct. 20, 2005

Related U.S. Application Data

(63) Continuation of application No. 10/091,220, filed on Mar. 4, 2002, now Pat. No. 6,907,576.

(51) Int. Cl.
G06F 15/00 (2006.01)
G06F 13/00 (2006.01)
(52) U.S. Cl. ....................... 715/791; 715/788
(58) Field of Classification Search ........ 715/751–754, 715/747, 848, 786, 854, 778, 788, 791
See application file for complete search history.

(56) References Cited

U.S. PATENT DOCUMENTS

| | | | |
|---|---|---|---|
| 5,754,348 A | 5/1998 | Soohoo | |
| 5,943,053 A * | 8/1999 | Ludolph et al. | 715/790 |
| 6,708,172 B1 * | 3/2004 | Wong et al. | 707/10 |
| 6,798,897 B1 | 9/2004 | Rosenberg | |
| 2005/0273727 A1 | 12/2005 | Barbanson | 715/786 |

OTHER PUBLICATIONS

Notice of Allowance mailed Jun. 6, 2007 cited in related U.S. Appl. No. 11/150,718.
*WebZoom Questions and Answers*, http://stage-webtv/usability/people/darnell/webzoom/qanda.htm, Oct. 3, 2001.
Notice of Allowance mailed Sep. 28, 2007, cited in related U.S. Appl. No. 11/150,718.

* cited by examiner

*Primary Examiner*—Cao (Kevin) Nguyen
(74) *Attorney, Agent, or Firm*—Workman Nydegger

(57) ABSTRACT

Systems and methods for repositioning selectable content. Content that includes selectable items is displayed on a display device through a user interface. When an item is selected, the item is repositioned and sometimes resized so that the selected item is more easily viewed. If the item includes text, the text is more legible because it has been enlarged. Other items included in the content that are not currently selected are not enlarged or modified. When a new item is selected, the new item is repositioned or resized and the previously selected item returns to a previous state.

20 Claims, 5 Drawing Sheets

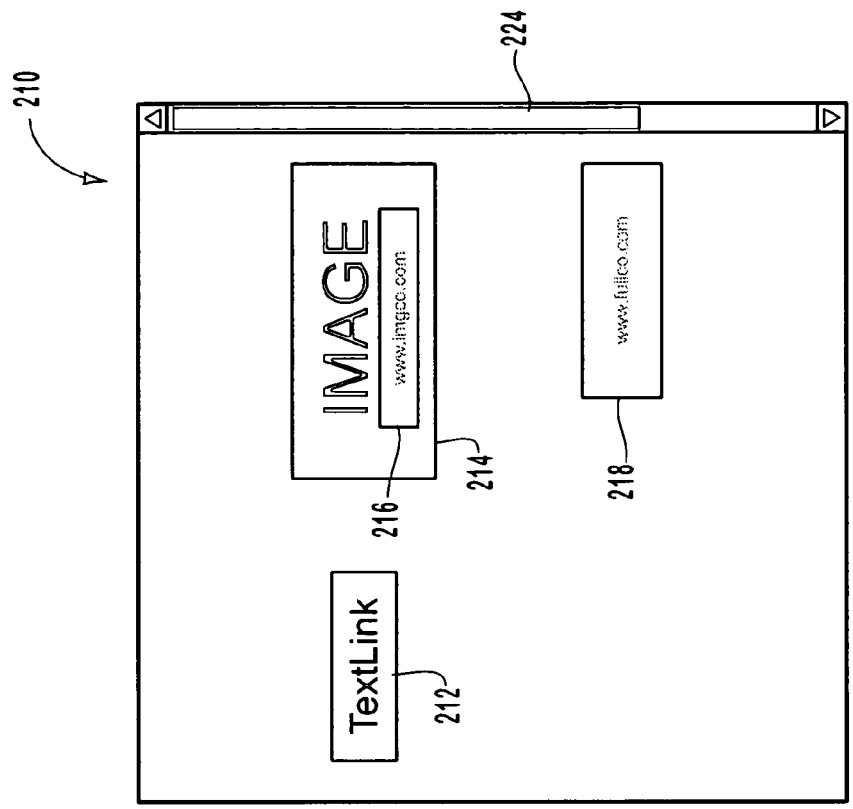
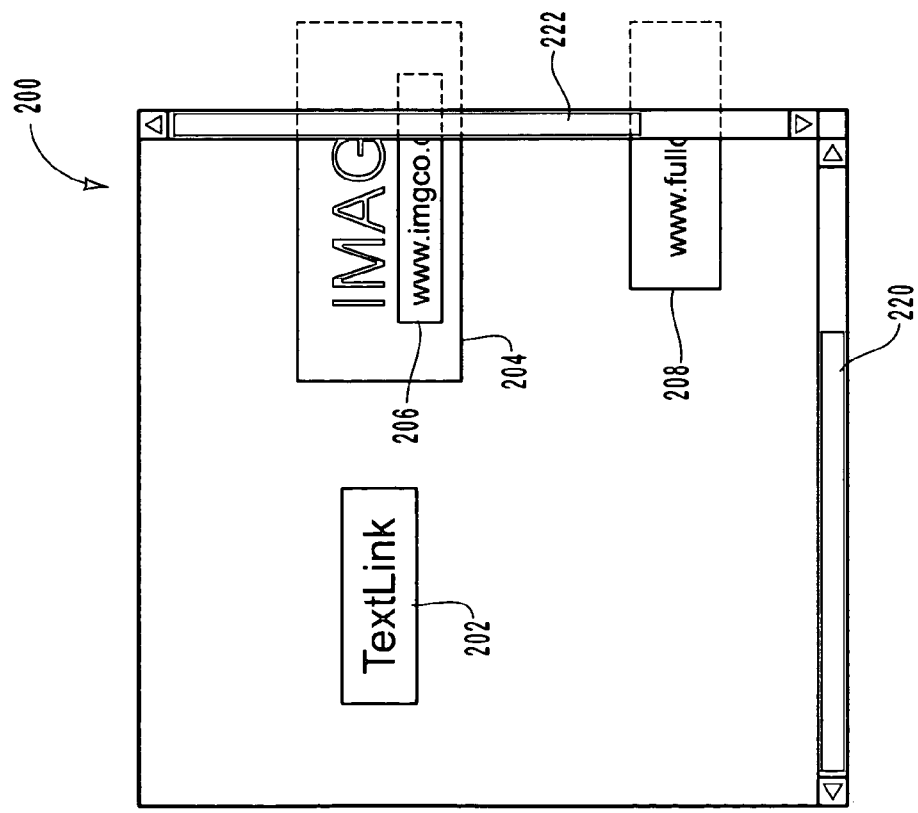

LEGIBILITY OF SELECTED CONTENT

CROSS-REFERENCE TO RELATED APPLICATIONS

This application is a continuation of 10/091,220, filed Mar. 4, 2002, and entitled "IMPROVING THE LEGIBILITY OF SELECTED CONTENT" now U.S. Pat. No. 6,907,576, and which is incorporated here by reference.

BACKGROUND OF THE INVENTION

1. The Field of the Invention

The present invention relates to improving the legibility of content in a user interface. More particularly, the present invention relates to systems, methods, and computer program products for improving the legibility of a user interface by selectively enlarging portions of the user interface or by enlarging selected content in the user interface.

2. Background and Relevant Art

When the Internet was initially created, it was only accessible from computers in a strict sense and relatively few people had the ability to access the Internet. The Internet, however, has changed drastically and today, the Internet is accessible from a myriad of other devices such as personal digital assistants, Internet appliances, and cellular telephones. The Internet is also accessible using a set top box connected with a television set instead of a computer monitor.

In spite of this growth, the Internet still presents some problems that need to be solved. One of the problems faced by users and web page or content designers is that the same content is ultimately displayed on many different display devices. Most web pages, for example, are intended for display on a computer monitor that has known resolutions (such as 640×480 or 600×800, for example). Many of the other display devices, unfortunately, have vastly different display capabilities. Because the resolutions and display capabilities of other devices are different from the resolution and display capabilities of a computer monitor, displaying the same web pages on other display devices is problematic and inconvenient.

For example, a particular web page, when displayed on a computer monitor, may only require the user to scroll in the vertical direction. Internet users are typically accustomed to scrolling in a vertical direction and are most likely not concerned or bothered by this requirement. The same web page, when displayed on a television that has less resolution than a computer monitor, will likely require the user to scroll in a horizontal direction in addition to the vertical direction.

This is often viewed as undesirable from the perspective of both the user and the content designer for several reasons. Requiring the user to scroll in both directions makes some web pages more difficult to read. The user may be required to repeatedly scroll back and forth horizontally in order to read lines of text. In contrast with a web page that only requires vertical scrolling, a user is able to read many lines of text before scrolling vertically. In addition, many users are not accustomed to scrolling in a horizontal direction and prefer to scroll in the vertical direction.

This problem has been partially solved by resizing or reformatting content such as a web page before it is displayed on a display device such as a television set. Resizing the content is often performed by a proxy server, but may also be performed by the set top box or by another device. Even though this may remove the problems associated with horizontal scrolling, resizing or reformatting content introduces another problem that is related to the legibility of the content or of the web page.

When the images, text, selectable text, and other content of a web page are resized such that they may be displayed, for example, on a television set without requiring the user to scroll horizontally, some of the content often becomes difficult to view or read because it is has been resized. In particular, content such as images that contain text as part of the image may be difficult to read because the text has been made smaller or has become irregularly shaped. This often occurs because text that is part of an image, for example, is not recognized as text during the resizing process. Textual characteristics are therefore not accounted for as the image is resized. While the image as a whole may be recognizable, the text portion of the image may have changed such that it is more difficult to view and/or read. Thus, the legibility of the content or of the web page or of the user interface suffers when the content is resized to accommodate a particular display device.

SUMMARY OF THE INVENTION

The present invention recognizes the limitations of the prior art and the need for systems, methods, and computer program products that are able to improve the legibility of a user interface or of selected content displayed in the user interface. Improved legibility and readability of the user interface is achieved by enlarging selectable portions or items of the content displayed in the user interface.

When a user interface is initially presented to the user or when a web page is initially loaded by a set top box, an item or a portion of the content displayed in the user interface is usually selected or identified by, for example, placing the cursor on the item such that the user can activate the selected item without having to move the cursor to that item. The item or content that is initially selected is enlarged, which provides the advantage of making the item or content more easily viewed by the user. The selected item is also more legible because it is larger. Alternatively, when a user interface is initially presented to the user, none of the content is enlarged until the user takes some action, such as selecting an item or moving the cursor. When an item is selected, the rest of the content in the user interface is unaffected and is not enlarged.

When the user decides to select a new item, the cursor or other visual indicator that identifies the selected content is moved by the user to a new selection. The newly selected item or content is enlarged and the old item that was previously selected returns to the size it had before it was enlarged. When an item is near the edge of the user interface and enlarging the item would otherwise require the user to scroll in order to view the selected and enlarged item, that item is repositioned such that scrolling is not required.

In some situations, the item is sufficiently large such that no enlargement is required. Thus, parameters or conditions can be set that determine when an item is to be enlarged. For example, items that are larger than a predetermined size may not require enlargement in order to be legibly viewed. Alternatively, the size of the selected item may determine the factor by which the selected item is enlarged.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A is a block diagram that illustrates a screenshot of a web page or a user interface that has not been resized and that requires a user to scroll both horizontally and vertically in order to view all of the content on the web page;

FIG. 2B is a block diagram that illustrates a screen shot of a web page or a user interface that has been resized such that horizontal scrolling is no longer required;

DETAILED DESCRIPTION OF THE PREFERRED EMBODIMENTS

Television, interactive television, web surfing, computer programs, and other activities usually have a user interface through which data or content is presented to a user. In fact, a user interface is an important aspect of these kinds of applications. As previously mentioned, one of the problems encountered by users is that content is not displayed equally on different devices. In particular, screen legibility on televisions is often difficult because some bitmaps or web pages are resized in order to accommodate the resolution of a television, which is usually lower than the resolution of a computer monitor, for example.

Resizing a bitmap or a web page decreases the ability of the user to view the content. For instance, the legibility of text is reduced in some instances. The present invention is directed to improving the legibility of the user interface. This is accomplished by enlarging the contextually relevant portion of the user interface. More particularly, the portion of the user interface that is currently selected is enlarged such that the current selection or text that is part of the current selection is enlarged and more easily viewed, which results in increased legibility.

Figure 1:
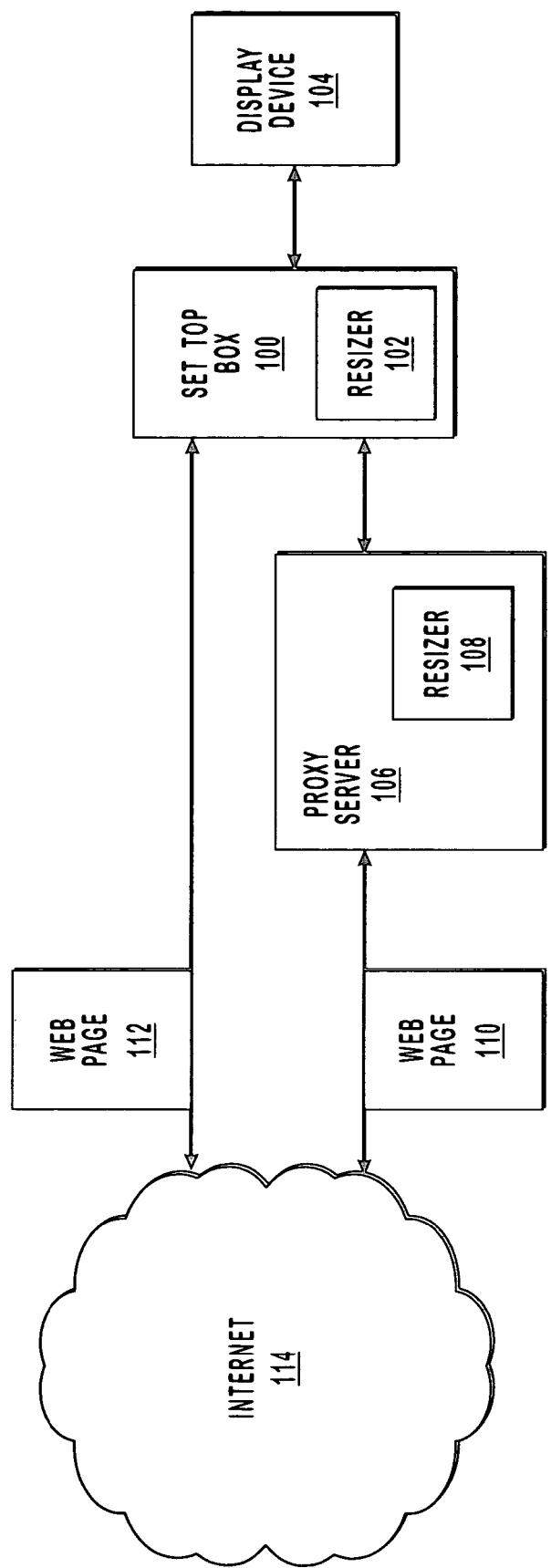
FIG. 1 illustrates an exemplary environment for implementing the present invention.

FIG. 1 is a block diagram illustrating an exemplary environment for implementing the present invention. FIG. 1 illustrates a set top box 100 that is capable of receiving content from a source such as the Internet 114 either directly or through a proxy server 106. The set top box 100 is also able to receive content from other sources, including but not limited to, satellite systems and cable television systems. The set top box 100 is an example of a variety of different processing devices that are capable of receiving content from various sources. Exemplary set top boxes include, but are not limited to, Internet terminals, cable boxes, satellite receivers, digital video recorders, computers, Internet set top boxes, and the like or any combination thereof.

The content received by the set top box 100 includes, but is not limited to, programming content including television programs, program guide data for use with the programming content, streaming video/audio, image data, text data, web pages, and the like and any combination thereof.

The set top box 100 is typically connected with a display device 104, which may be a separate display device such as a television set or a computer monitor or is integrated with the set top box 100. When the set top box 100 interacts with the Internet 114 directly, the web page 112 is retrieved by the set top box 100 and displayed on the display device 104. As previously stated, the design of the web page 112 may not be compatible with the display device 104 and as a result, the web page 112 may not display in a manner that is convenient for the user. For example, the user may be required to scroll the displayed web page in both horizontal and vertical directions in order to fully view the web page 112. Similarly, the web page 110 that is retrieved through a proxy server 106 may be treated in a similar manner and may not be displayed as desired.

In other words, many web pages are designed for display on a computer monitor, which has higher resolution than most television sets. As a result, web pages that only require the user to scroll in the vertical direction when viewed on a computer monitor may require the user to scroll the web page in both the horizontal and vertical directions when viewed on a television set.

To alleviate this problem, the proxy server 106 has a resizer 108 and/or the set top box 100 has a resizer 102. The resizers 108 and 102 scale or resize the web page on the display device 104 such that only vertical scrolling, if necessary, is required. In other words, the web pages 112 or 110 are effectively scaled in a horizontal direction in order to eliminate the need to horizontally scroll the web page. By scaling or resizing web pages in this manner, the user experience is similar regardless of whether the user is viewing web pages on a computer monitor or on a television set. In some instances, the web pages will also be scaled vertically.

FIGS. 2A and 2B illustrates more specifically the function of the resizers 102 and 108. FIG. 2A illustrates a screen shot of a web page displayed, for example, on a display device such as a television screen without resizing the web page. In this example, a scroll bar 222 is provided to the user and indicates that the web page may be scrolled in a vertical direction. This indicates that there is content that the user cannot presently view on the display device. By scrolling vertically, the unseen content will be displayed.

FIG. 2A also illustrates a scroll bar 220 that is used to scroll the web page horizontally. The presence of the scroll bar 220 indicates that there is content to the left or right that is not currently displayed. In this example, the image 204 and the text link 208 are only partially displayed in the screen shot 200. The unseen portion of the image 204 and the text link 208 is indicated by dashed lines. By horizontally scrolling the web page, the user will be able to view the entire image 204 and the entire text link 208. However, it is possible that the text link 202 will no longer be completely visible to the user as the user scrolls horizontally. As previously stated, requiring the user to scroll in both a horizontal and vertical direction is usually undesirable. Also, it is understood that other visual cues for scrolling either horizontally and/or vertically may be used in the user interface.

FIG. 2B illustrates a screen shot of the same web page as illustrated in FIG. 2A with the difference that the web page has been scaled horizontally. In some instances, some vertical scaling may also occur. As indicated by the scroll bar 224, the web page shown in the screen shot 210 illustrates that the web page can be scaled vertically. The absence of a horizontal scroll bar indicates that the web page cannot be scrolled horizontally. This results in a more uniform experience for the user as most users are unaccustomed to scrolling horizontally and vertical scrolling is more convenient for the user.

FIG. 2B also illustrates one effect of scaling the web page as described. The text and images that are shown in the screen shot 210 are effectively compressed or smaller than they were in the original web page of FIG. 2A in order to eliminate the need to scroll horizontally. This scaling or compression can result in some of the content such as text or other data becoming less viewable to a user. In the case of text, the text is often rendered illegible and unreadable. For example, the legibility of normal text can be preserved by increasing the font size of the text. The legibility of text included in an image, however, cannot be preserved in this manner because the text is encoded as pixel data instead of text data. Thus, the font of text that is part of an image cannot be increased like regular text.

In this example, the text link 212 is still viewable and legible to a user. The text 216, which is a portion of the image 214, is no longer clear to a user. As illustrated in FIG. 2Bk the text 216 is hard to view and/or read. The text link 218 is similarly affected. Because images and text links are often used to direct the user to other areas of a network or are used to convey information to a user, it is desirable to have images with text and text links that are readable and legible.

Figure 3B:
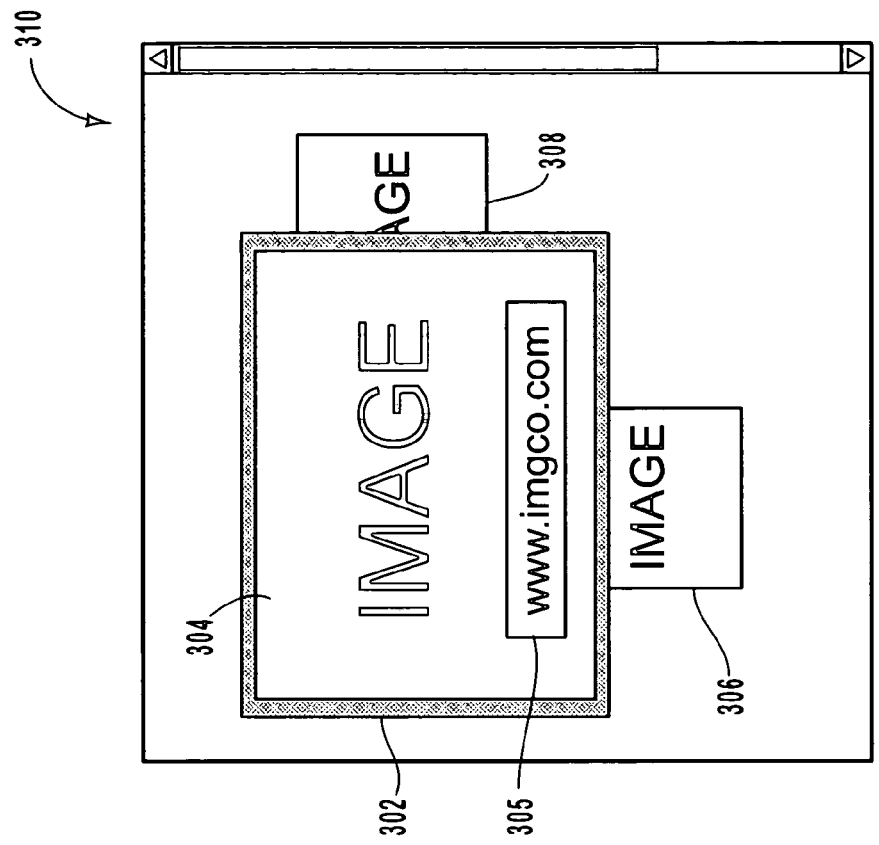
FIG. 3B is a block diagram that illustrates the same web page or user interface of FIG. 3A, but the selected item has been enlarged.
Figure 3A:
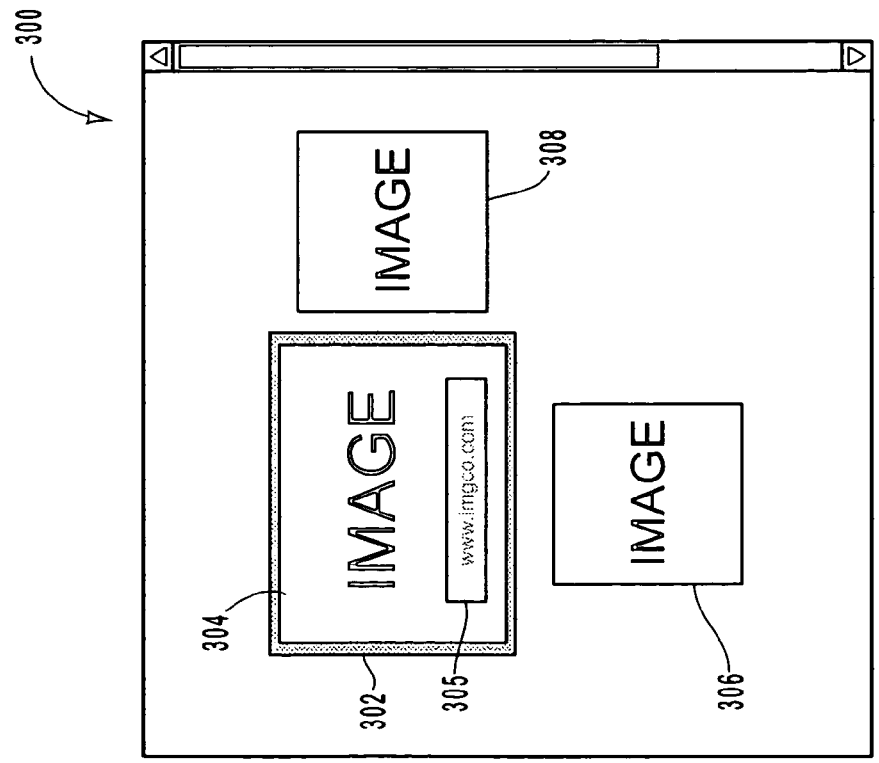
FIG. 3A is a block diagram illustrating a screenshot of a web page or a user interface where an item is selected, but not enlarged.

FIG. 3A illustrates one example of ensuring that data or content such as, for example, text links or text that is part of an image becomes viewable, more readable, or more legible to the user. FIG. 3A includes a screen shot 300 of, for example, a web page that has been resized for display on a display device. The screen shot 300 of a user interface illustrates content that includes an image 304, an image 308, and an image 306. The image 304 includes text 305. An image, as used herein, may refer to content that is displayed on the display device and includes, but is not limited to, a gif image, text, a hyperlink, and the like or any combination thereof.

As previously stated, the text 305 may be difficult to read or view because it has been resized for display on the display device. In this example, a box 302 appears around the borders of the image 304 to indicate that the image 304 is currently selected or that the image 304 is the portion of the content that is currently selected. In some instances, a selectable item is usually selected when the web page is initially opened and displayed to the user. Alternatively, no item or no portion of the content on the web page is initially selected until some action is taken by the user. It is understood that other visual cues may be used to indicate which item or which content is selected. In this example, a box 302 is used as described.

FIG. 3B illustrates the screen shot of FIG. 3A with the difference that the selected item, which is image 304 in this case, has been enlarged from an original size to an enlarged size. The original size is illustrated in FIG. 3A while the enlarged size is shown in FIG. 3B. The image 304 can be enlarged according to a predetermined or user selectable factor. In some cases, the factor(s) used to enlarge the selected content vary according to the original size of the selected content. Thus, larger images or content are not enlarged as much as smaller images or content, for example. Because the image 304 is enlarged, the text 305 that is part of the image 304 is similarly enlarged and becomes more viewable or legible to a user. In one example, the image 304 is displayed in its original size and the scaling factor used to initially scale the image 304 is reversed.

Usually, only the selected item is enlarged. Other content included in the user interface or in the web page is not enlarged and is usually not displaced or affected by the enlarged item. Enlarging the image 304 may result in other content being temporarily obscured or covered. In this example, the image 308 and the image 306 are only partially viewable when the selected image 304 is enlarged, whereas the image 308 and the image 306 are completely viewable when the image 304 is not selected. However, the image 308 and the image 306 are not affected and will be viewable when another item is selected. The action required to change the current selection to another selection is typically the same regardless of whether the next item is obscured in any way, if at all, by the current selection.

Figure 3C:
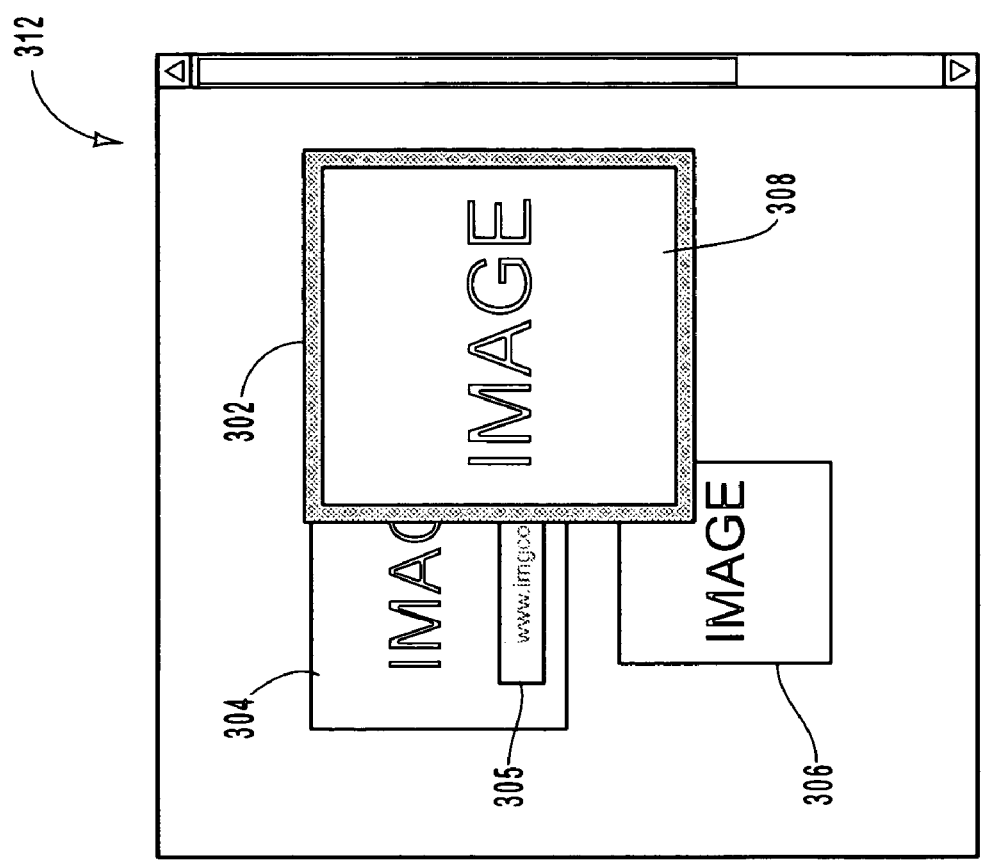
FIG. 3C is a block diagram illustrating the same web page or user interface of FIG. 3A and FIG. 3B, but a new item or content has been selected and enlarged.

FIG. 3C illustrates the same screen shot as FIGS. 3A and 3B. In this case, however, the user has selected a new item, which is the image 308 in this example. In this, case, the user has moved the box 302 to another selectable item, or image 308. The image 304 returns to its unselected or previous size and the image 308 is enlarged by the same factor as the image 304 was enlarged. Alternatively, the image 308 may be enlarged by a different factor as previously mentioned. In this example, part of the image 304 and the image 306 are now partially obscured because the image 308 is enlarged. The selection of the image 308 is indicated by the box 302, which surrounds the selected image 308.

The factor by which selected content is enlarged may depend on the size of the selected content. Thus, smaller items may be enlarged by a larger factor, while larger items are enlarged by a smaller factor. In some instances, the item may not be enlarged if the item is larger than a predetermined size.

In some situations, when an item or selected content is enlarged, part of the selected item may cause the web page to require horizontal scrolling because of the need to accommodate the enlarged item. This can be avoided by repositioning the enlarged item such that horizontal scrolling is not required. For an enlarged image on the right side of the screen shot 312, the enlarged image may be relocated to the left in addition to being enlarged. For an enlarged image on the left side of the screen shot 312, the enlarge image may be relocated to the right in addition to being enlarged. If an image is near the top or bottom of a screen shot, the image may be relocated either up or down such that the image is not scrolled in order to accommodate the enlarged image. Other content or items on the web page are not affected as the enlarged item is repositioned in this manner. However, some of the other content may be temporarily obscured while the selected item is enlarged. Alternatively, the other items may be repositioned to accommodate the enlarged item such that no item is obscured by the enlarged item.

The scaling factors used to enlarge selected items can vary according to the original size of the item. The scaling factors that are employed can be determined empirically. Alternatively, pre determined factors may be used to scale selected items or content. Because one advantage of the present invention is related to text legibility, one approach to enlargement can be related to text size. The following examples illustrate specific examples of how an image might be enlarged. It is understood than other scaling factors may be selected for use in enlarging items on a display device.

For example, text is often rendered in 12 point font. If the size of an image is less that 3 times the size of 12 point font, then that image should be enlarged by a factor of 4, for example. Even if the image does not contain text, the image will be more viewable. In another example, the style sheet of a particular web page can be consulted to determine the font size. Using this value, the scaling factor can be better determined. The requirement of actually enlarging the selected item is known to one of skill in the art. Repositioning an item on a display device is also known to one of skill in the art.

In another example, the scaling factor can be determined according to the size of the selected image relative to the display area of the screen. For example, all items that occupy less than 1/8 of the display area are enlarged by a factor of 4. All items that occupy between 1/8 and 1/4 of the display area are enlarged by a factor of 2. Items greater than 1/4 are not enlarged. In view of the multiple scaling schemes that can be employed, only a few are discussed for illustrative purposes. As previously stated, empirical data may determine the optimal scaling factors for any particular image or selected content.

The present invention extends to both methods and systems for improving the ability of a user to view selected content. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
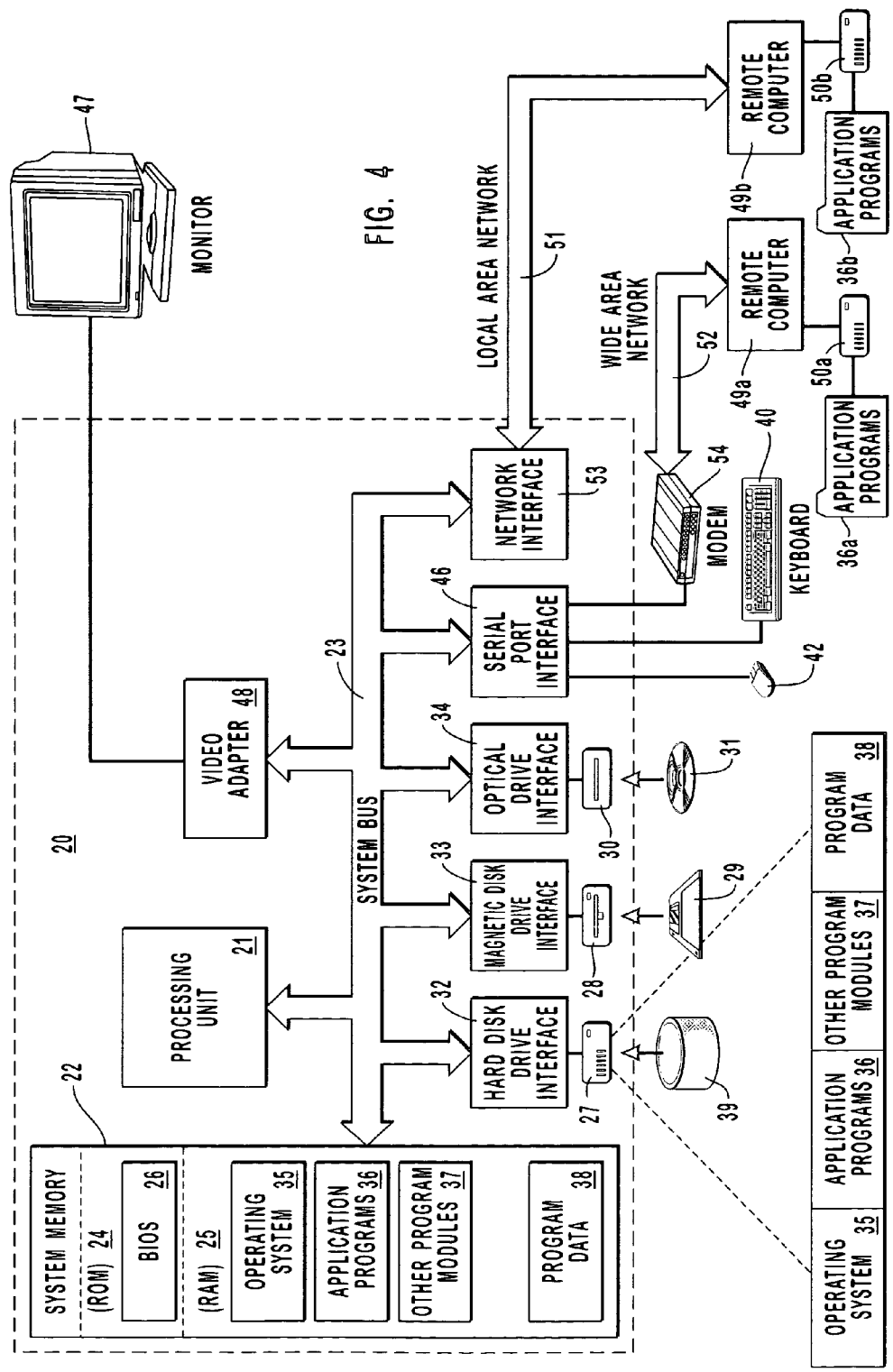
FIG. 4 illustrates an exemplary system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, personal digital assistant or other hand held device, infra red or radio frequency remote control, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a computing system modifying content displayed to a user in response to user selection of some of the displayed content, the method comprising:
    displaying content to a user on a display screen, the content having previously been resized such that some of the content is rendered less viewable to a user than content which has not been resized, the content including a selectable display item;
    receiving user input selecting the item; and
    in response to the user input, selecting the item and after the selected item having been enlarged without enlarging other portions of the resized content, repositioning the selected item on the display screen such that scrolling is not required.

2. A method as recited in claim 1, the method further including resizing the selected item in response to the user input.

3. A method as recited in claim 2, wherein the resizing includes enlarging the selected item without enlarging other portions of the displayed content.

4. A method as recited in claim 2, wherein resizing includes enlarging the selected item when the selected item is smaller than a predetermined size.

5. A method as recited in claim 2, the method further including displaying the resized item without resizing, obscuring or otherwise affecting display of one or more other items that are displayed on the display screen at a same time that the resized item is displayed.

6. A method as recited in claim 1, wherein repositioning the selected item obscures at least one other item displayed on the display screen.

7. A method as recited in claim 1, wherein repositioning the selected item only temporarily obscures said at least one other item displayed on the display screen.

8. A method as recited in claim 1, wherein repositioning the selected item causes at least one other item displayed on the display screen to also be repositioned.

9. A method as recited in claim 1, wherein repositioning the selected item includes repositioning the selected item, upon resizing the selected item, and so as to avoid any need to perform scrolling of the displayed content to view a complete view of the selected item, which would otherwise be required to view the complete view of the selected item after it is resized.

10. A method as recited in claim 9, wherein scrolling, comprises horizontal scrolling.

11. A method as defined in claim 1, wherein the selected item includes text.

12. A method as defined in claim 1, wherein the method further includes:
    receiving new user input selecting a newly selected item and returning the previously selected item to an previous display format.

13. A method as recited in claim 1, wherein returning the selected item to a pervious display format includes resizing the selected item.

14. A method as defined in claim 1, wherein the method further includes:
    upon receiving the new user input, repositioning the newly selected item on the display screen.

15. A computer program product for use in a computing system and comprising one or more computer-readable media having computer-executable instructions encoded thereon for implementing a method in the computing system for modifying content displayed to a user in response to user selection of some of the displayed content, the method being the method recited in claim 1.

16. A computer program product as recited in claim 15, the method further including resizing the selected item in response to the user input.

17. A computer program product as recited in claim 16, the method further including displaying the resized item without resizing, obscuring or otherwise affecting display of one or more other items that are displayed on the display screen at a same time that the resized item is displayed.

18. A computer program product as defined in claim 15, wherein repositioning the selected item is only performed upon enlarging the selected item to a size that would require the user to scroll either horizontally or vertically to view portions of the enlarged and selected item.

19. A computer program product as defined in claim 15, wherein the method further includes:
    receiving new user input selecting a newly selected item;
    returning the previously selected item to an previous display format; and
    repositioning the newly selected item on the display screen.

20. A computing system connectable to a display screen, comprising at least one computer processor and one or more computer-readable media having computer-executable instructions stored thereon for implementing a method for modifying content displayed to a user in response to user selection of some of the displayed content, the method being the method recited in claim 1.

* * * * *